United States Patent [19]
Chen

[11] Patent Number: 5,761,609
[45] Date of Patent: Jun. 2, 1998

[54] LIMITED USE CIRCUIT

[75] Inventor: Chung-Shan Chen, Taipei, Taiwan

[73] Assignee: United Microelectronics Corporation, Hsinchu, Taiwan

[21] Appl. No.: 400,936

[22] Filed: Mar. 9, 1995

[51] Int. Cl.⁶ .................................................. H04L 9/00
[52] U.S. Cl. ........................... 455/26.1; 377/15; 327/525; 380/4; 380/6; 380/23; 380/25
[58] Field of Search .................... 380/4, 6, 23, 24, 380/25; 455/26.1; 235/379, 380; 340/825.31, 825.34; 327/525; 377/1, 2, 15

[56] References Cited

U.S. PATENT DOCUMENTS

| | | | |
|---|---|---|---|
| 4,642,631 | 2/1987 | Rak | 340/825.31 |
| 4,749,991 | 6/1988 | Davis et al. | 340/825.31 |
| 4,879,645 | 11/1989 | Tamada et al. | 380/23 X |
| 5,442,704 | 8/1995 | Holtey | 380/23 |

*Primary Examiner*—Bernarr E. Gregory
*Attorney, Agent, or Firm*—Barnes, Kisselle, Raisch, Choate, Whittemore & Hulbert, P.C.

[57] ABSTRACT

A limited use circuit in an electronic system that comprises a state machine which controls the operability of the electronic system and determines after boot whether a non-volatile memory device is at its initial data point and then allows the system to operate if it is at its initial data point or cause the electronic system to go down if it is not wherein the state machine is comprised of registers and logic gates or a CPU and a mask circuit and the non-volatile memory device may be selected from the group consisting of PLD, PAL, PLA, EEPROM, FLASH and ROM.

6 Claims, 1 Drawing Sheet

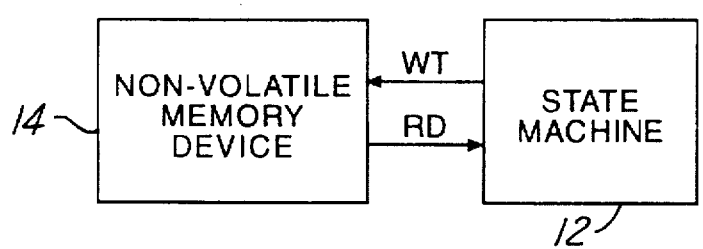
FIG. 1
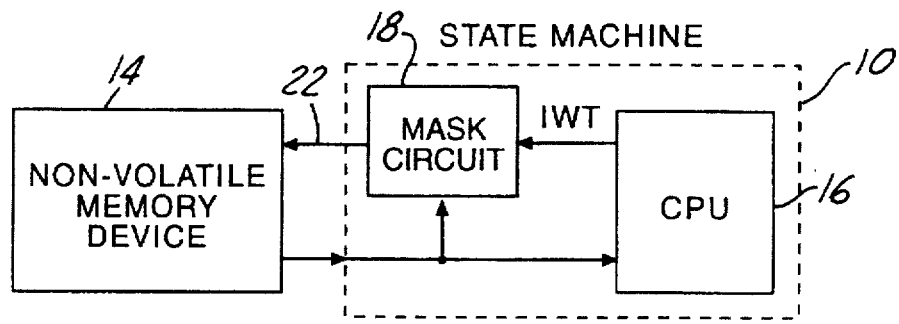
FIG. 2
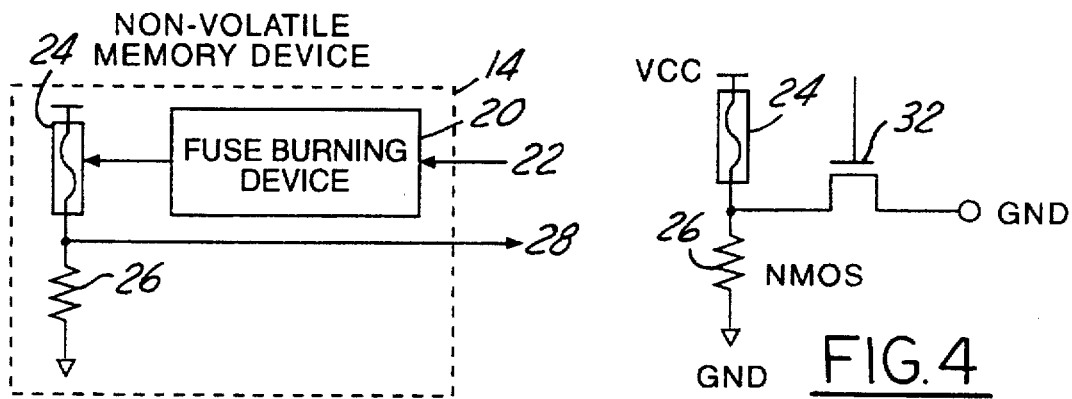
FIG. 3
FIG. 4
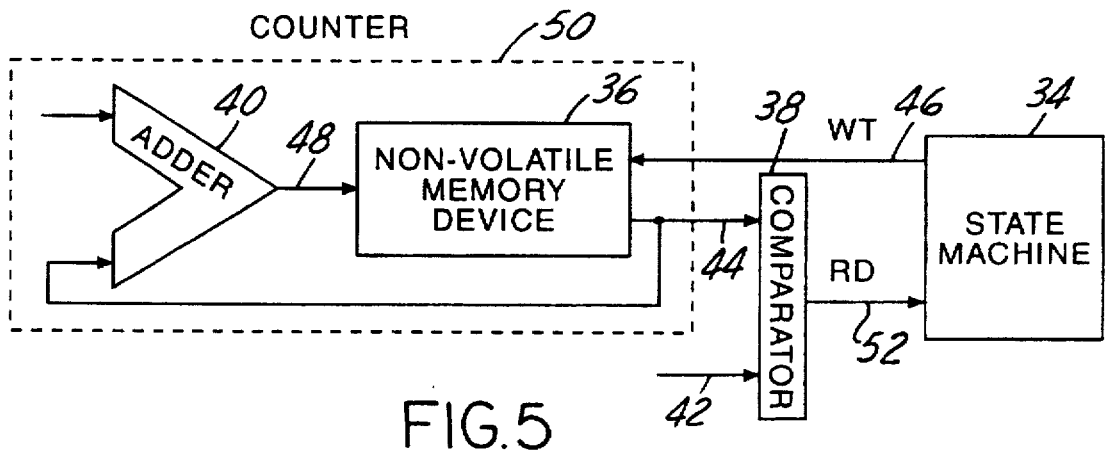
FIG. 5

LIMITED USE CIRCUIT

FIELD OF THE INVENTION

The present invention is generally related to a circuit that can be used for only a limited number of times and more particularly, is related to a circuit that can be used only for a limited number of times which comprises a state machine for controlling the operation of the system and a non-volatile memory device for storing the system status after a power interruption.

BACKGROUND OF THE INVENTION

Computers and electronic data processing techniques are widely used today either in a business or in a home environment. As the electronic system usage becomes more important in the daily business environment, the need for a security system on electronic systems also becomes more important. For instance, such need arises in the prevention of software, hardware and whole system copying or unauthorized use of data.

In a conventional electronic system, the system can be turned on (or booted up) for as many times as desired without any limitation. This unlimited access to an electronic system becomes a problem when possibly one of such use or a boot up is unauthorized. This becomes even more important when confidential military or business information are stored in an electronic system that must be protected by strict access control.

Security method by using software, such as the installation of pass words or other locking devices have been tried by others. However, these security methods are not foolproof to someone with sophisticated computer skills. It may be a time-consuming but not an impossible task to defeat a pass word security system.

It is therefore an object of the present invention to provide a limited use circuit in a computer system that can be turned on for only a limited number of times in that the electronic system is protected by a hardware method and not by a software method.

It is another object of the present invention to provide a limited use circuit in an electronic system that can be turned on for only a limited number of times in order to prevent unauthorized access to the electronic system.

It is a further object of the present invention to provide a limited use circuit in an electronic system that can be turned on for only a limited number of times such that confidential business information or secret military data may be protected.

It is another further object of the present invention to provide a limited use circuit in an electronic system such that only limited number of uses is provided which comprises a state machine for controlling the system operation and a non-volatile memory device for storing the system status after power interruption.

It is yet another object of the present invention to provide a limited use circuit in an electronic system that can be used only for a limited number of times that utilizes a non-volatile memory device such as PLD, EPLD, PAL, PLA, EEPROM, FLASH and ROM.

It is yet another further object of the present invention to provide a single use circuit in an electronic system that can be used only once such that the electronic system cannot be turned on after such single use.

SUMMARY OF THE INVENTION

In accordance with the present invention, a limited use circuit in an electronic system that allows for only a limited number of uses of the electronic system is provided.

In a preferred embodiment, the circuit comprises a state machine which controls the operation of the whole system and determines after booting up whether a non-volatile memory device is at its initial data point. The system will operate if the answer is yes and the system will not operate and go down if the answer is no. The state machine can be comprised of either registers and logic gates or a CPU and a mask circuit. The non-volatile memory device may be selected from one of the following, PLD, EPLD, PAL, PLA, EEPROM, FLASH, and ROM or any other memory device that retains its stored data after a power interruption. The non-volatile memory device may further include a fuse, a fuse burning circuit, and a fuse state detector.

BRIEF DESCRIPTION OF THE DRAWINGS

Other objects, features and advantages of the present invention will become apparent upon consideration of the specification and the appended drawings, in which:

FIG. 1 is a block diagram of the present invention that comprises a state machine and a non-volatile memory device.

FIG. 2 is a block diagram of the present invention state machine which comprises a CPU and a mask circuit.

FIG. 3 is a circuit diagram of a non-volatile memory device that comprises a fuse burning circuit, a fuse and a resistor.

FIG. 4 is a circuit diagram of another embodiment of the non-volatile memory device utilizing a NMOS transistor, a fuse and a register.

FIG. 5 is a block diagram of an alternate embodiment of the present invention.

DETAILED DESCRIPTION OF THE EMBODIMENTS

The present invention discloses a limited use circuit for an electronic system that can be used only for a limited number of times such that any copying or unauthorized use of the electronic system may be prevented.

One of the main objectives of the present invention is to prevent the copying or unauthorized use of the electronic system. The present invention utilizes a non-volatile memory device for storing its system status after a power interruption such that when the system is down or after a power interruption under unauthorized use it cannot be turned on again. The electronic system therefore is a system that can be turned on once only and after such one use, the system can no longer be operated. The present invention limited use circuit can be included in an IC chip such that the chip can be used only once. When the IC chip or the limited use circuit is included in the circuit of an electronic system, the electronic system can be prevented from being copied or being used unauthorized. The present invention limited use circuit is especially suitable for use in high cost, high confidentiality commercial or military application.

The working principle of the present invention can be explained as follows. Referring initial to FIG. 1, a present invention limited use circuit 10 comprising a state machine 12 and a non-volatile memory device 14 is shown. For a non-volatile memory device 14, there is a fixed initial data input at the time when the memory device is first manufactured. It is also known that for any electronic system or an IC, the system or the IC initiates a setup procedure after the boot up of the computer or the installation of such IC.

The present invention utilizes the principle that after an electronic system is set up, the state machine 12 is used to read the initial data value of the non-volatile memory device 14 to determine whether it is the same initial data value that was stored when the device was first manufactured. If data read by the state machine 12 is not the same initial data value stored when the non-volatile memory device 14 was first manufactured, it indicates that the system was booted up before such that the state machine 12 will not execute the next step in the setup procedure. The system goes down for failure of proper execution of the setup procedure.

On the other hand, if the data read by the state machine 12 is the same initial data value stored at manufacturing of the non-volatile memory device 14, it indicates that the system has not been booted up before. The state machine 12 then execute the next step of the setup procedure such that the system setup can be completed. This setup procedure includes the step of changing the initial data value of the non-volatile memory device 14. The state machine 12 then returns to its routine execution and provides services that it is requested of. This procedure enables the electronic system that is equipped with the limited use circuit to continue execute its normal function such that the normal function of the system cannot be changed by software or repeated turn on and off.

The present invention limited use circuit can be included into a system such that the system can be used only for a limited number of times. If the present invention limited use circuit is included into an IC chip, the chip becomes available for use for only a limited number of times. This presents a sufficient deterrent for unauthorized copying of the hardware or software of the electronic system. Each time the electronic system is down or the circuit is short or broken, the IC malfunctions which leads to a serious loss of data. When the present invention limited use circuit is included as a small part of a large circuit, several limited use circuits may be included in different parts of the large network circuit, it would be very difficult to find the cause of the malfunction when the electronic system is down. This further deters the unauthorized use or copying of the electronic system.

In an alternate embodiment of the present invention, in order to remedy the high cost of a single-use circuit, the present invention can be modified to a conditional single-use circuit. For instance, when the state machine 12 reads the initial data value of the non-volatile memory device after a boot up, if the data read is the same as the initial data value at manufacturing, it indicates that the system has not been used unauthorized and then the steps of system setup and system execution can be carried out. During the system execution, the conditional single-use circuit monitors the system for any unauthorized use. When any unauthorized use is detected, the conditional single-use circuit changes the initial data value in the non-volatile memory device such that after the system is down, the system cannot be boot up again. After booting up, the state machine of the present invention determines the initial data value of the non-volatile memory device and, if such value is not the initial data value at manufacturing, it indicates unauthorized use such that the system stops executing the following setup and execution steps.

In FIG. 2, the components of a state machine 10 are shown. The state machine 10 comprises a central processing unit 16 and a mask circuit 18. The mask circuit 18 is used to prevent the CPU to change to its original value after it changes the original value of the non-volatile memory. For instance, when the initial value is "Low," if the CPU changes the non-volatile memory 14 to "High," it stays permanently as "High" since the mask circuit 18 will prevent the CPU to write "Low" into the non-volatile memory 18.

A detailed circuit of a non-volatile memory device 14 is shown in FIG. 3. A fuse burning device 20 receives signals 22 from the mask circuit 18 of the state machine. The fuse burning device 20 in FIG. 3 must allow the passage of a high current through it. Most IC chips such as PLA and PAL are equipped with a similar device that has a fuse built-in. The fuse burning device 20 accepts an input from the circuit, execute the instructions and then outputs a high current enough to burn the fuse. The resistor 26 acts as a fuse state indicator such that the state of the fuse 26 can be read from signal 28.

Another embodiment of the non-volatile memory device 30 is shown in FIG. 4. A NMOS transistor 32 is used here as the fuse burning device. When the NMOS 32 receives signal 22 for "High," it requires the burning of fuse 24. Since signal 22 is "High" it turns the NMOS on such that there is a high current flowing from $V_{cc}$ to GND through the fuse and the NMOS. Since the fuse can only carry a small current and is lower than NMOS, the fuse will be burned. This makes the FIG. 4 apparatus always in a "Low" condition and cannot resume a "High" condition.

The present invention can be used for any predetermined number of times in a circuit. For instance, a single-use can be specified such that a circuit can be used only once. A circuit may be used three times by utilizing three single-use circuits connected in parallel such that one fuse is burned out each time. The number of uses may also be limited by the use of a digital counter. For instance, a digital counter may be preset at 4 or 5 counts such that when the upper limit of the counter is reached, the system can no longer be turned on.

A block diagram illustrating an alternate embodiment of the present invention is shown in FIG. 5. It illustrates a logic circuit of the present invention that can be utilized for a limited number of uses. In this specific embodiment, the circuit includes an electronic logic circuit for the detection of how many of the limited uses have actually been used in order to prevent any unauthorized use.

In FIG. 5, the alternate embodiment of the present invention includes a state machine 34 and a non-volatile memory device 36 similar to that shown in FIG. 1. The embodiment further includes a comparator 38 and an adder 40. To illustrate the operation of the embodiment, assuming that a preset maximum use is three times, the first input 42 of the two inputs 42 and 44 to the comparator 38 is fixed at 3 during the manufacturing process of the hardware. On the other hand, the non-volatile memory device 36 is preset at an initial value of 0 during the manufacturing of the hardware. When an electronic system equipped with the present invention limited use logic circuit is turned on for the first time, the second input 44 to comparator 38 which is the data output stored in the non-volatile memory device 36 is compared to input 42 to the comparator 38. It can thus be determined that the electronic system has not been used in excess of the predetermined number, i.e., 3, and as such, the present invention limited use circuit permits the electronic system to function in its normal fashion.

During the operation of the electronic system, the above-described method can be adopted by writing a command 46 and storing it into the non-volatile memory device 36. In the above-described example, where the initial value is 0, it is then added by 1 in the adder 40. The resulting signal 48 is then written into the non-volatile memory device 36. The adder 40 and the non-volatile memory device 36 therefore forms a counter 50 which is capable of taking one away from the number of counts each time when the electronic system is turned on in order to execute its function of limiting the number of uses of the system. Each time when the stored data in the non-volatile memory device 36 is increased by 1, it indicates that one use has been consumed by the system. Therefore, when the stored data in a non-volatile memory device 36 reaches the number of n, i.e., n =3, the result of the comparison in the comparator 38 is sent by signal 52 to the state machine 34 in order to enable the state machine to prohibit any further use of the system. This occurs when the result of the comparison indicates that the total predetermined number of uses has been reached.

A typical application of the present invention limited use circuit is in the quality inspection of semiconductors in a semiconductor manufacturing process. As shown in FIG. 5, assuming that a semiconductor manufacturing process requires two separate tests and the electronic system manufactured requires a limited number of uses of 3, the input 42 to comparator 38 can be preset at 5. This enables two tests to be first conducted, the number stored in the non-volatile memory device 38 then becomes 3 which enables the system to be used for three more times. On the other hand, if the electronic system is to be used only once after manufacturing , the number for signal 42 can be preset at 3 such that after two separate tests in the factory, it can only be used once by a user. The present invention therefore utilizes a state machine and a non-volatile memory device as its major components to enable a logic circuit for limiting the number of uses of an electronic system. The present invention therefore can protect the number of uses allowed for a certain electronic system as that shown in FIG. 5. Since the detection data of limited uses are stored in the hardware, unlike the circuits shown in FIGS. 1 and 2 which relies on the memory device of the system for storing data, the system shown in FIG. 5 is a further improvement in preventing copying and unauthorized uses.

While the present invention has been described in an illustrative manner, it should be understood that the terminology used is intended to be in a nature of words of description rather than of limitation.

Furthermore, while the present invention has been described in terms of several preferred embodiments thereof, it is to be appreciated that those skilled in the art will readily apply these teachings to other possible variations of the invention.

The embodiments of the invention language and exclusive property or privilege is claimed are defined as follows:
What is claimed is:

1. A limited use circuit for use in a electronic system, said circuit comprising:

a non-volatile memory means selected from the group consisting of programmable logic device (PLD), erasable programmable logic device (EPLD), programmable array logic (PAL), programmable logic array (PLA), electrically erasable programmable read only memory (EEPROM), flash memory, and read only memory (ROM) wherein said non-volatile memory means includes n devices, said n being $\geq 1$, each device comprising a fuse, a fuse burning means, means for programming said fuse, and a fuse state indicator, whereby n times of use of said electronic system are provided, and a control means which controls the operation of said electronic system and determines after boot up whether said non-volatile memory means is at its initial data point.

2. A limited use circuit for use in a electronic system, said circuit comprising:

a non-volatile memory means selected from the group consisting of programmable logic device (PLD), erasable programmable logic device (EPLD), programmable array logic (PAL), programmable logic array (PLA), electrically erasable programmable read only memory (EEPROM), flash memory, and read only memory (ROM), and a control means which controls the operation of said electronic system and determines after boot up whether said non-volatile memory means is at its initial data point, wherein said control means operates the electronic system if said non-volatile means is at its initial data point or cause the electronic system to go down if said non-volatile means is not at its initial data point.

3. A method of limiting the use of an electronic system, said method comprising the steps of:

providing an electronic circuit comprising a non-volatile memory means for storing a use status of said system and a control means controlling operation of said system;

establishing a predetermined number n of times for said system to be used, said n being $\geq 1$ and defining a number of boots up of said system;

writing an initial data into said non-volatile memory means;

changing said initial data in said non-volatile memory means into changed data with the said of said control means each time said system is booted up, each of said changes resulting in diminishing said n by 1;

comparing the changed data with said initial data; and prohibiting further booting said system up when said comparing shows that the number of said boots up reached n.

4. The method as claimed in claim 3, wherein said n=1.

5. A method of limiting the use of an electronic system, said method comprising the steps of:

providing an electronic circuit comprising a non-volatile memory means for storing a use status of said system and a control means controlling operation of said system;

establishing a predetermined number n of times for said system to be used, said n being $\geq 1$ and defining a number of turns-on of said system;

writing an initial data into said non-volatile memory means;

changing said initial data in said non-volatile memory means with the aid of said control means each time said system is turned on, each of said changing defining diminishing said n by 1;

comparing the changed data with said initial data; and prohibiting further turning said system on when said comparing shows that the number of said turns-on reached n.

6. The method as claimed in claim 5, wherein said n=1.

* * * * *